April 29, 1969 J. M. BEVIS 3,441,742

HOUSING AND RACK FOR READOUT APPARATUS USING STRIP PHOTOCELLS

Filed March 23, 1967 Sheet 1 of 2

INVENTOR
JEFFREY M. BEVIS

BY

Julius L. Rubinstein

ATTORNEY

HOUSING AND RACK FOR READOUT APPARATUS USING STRIP PHOTOCELLS

Filed March 23, 1967

INVENTOR
JEFFREY M. BEVIS
BY Julius L. Rubinstein
ATTORNEY 3,441,742
Patented Apr. 29, 1969

3,441,742

HOUSING AND RACK FOR READOUT APPARATUS USING STRIP PHOTOCELLS

Jeffrey M. Bevis, Long Beach, Calif., assignor to Chalco Engineering Corporation, Gardena, Calif.

Filed Mar. 23, 1967, Ser. No. 625,542
Int. Cl. H01j 5/02, 39/12
U.S. Cl. 250—239 6 Claims

ABSTRACT OF THE DISCLOSURE

In order to use strips of photocells in a perforated tape readout apparatus when the strips have a width which is greater than the size of the perforations plus the separation between perforations, a rack and housing are disclosed which mount the strips in stepped relation at an angle to the plane of the tape. Thus, the strip width projection in the plane of the tape of each strip of photocells does not exceed the desired amount.

This invention relates generally to a tape readout apparatus and more particularly to an arrangement for mounting strips of photoelectric cells in a reading head.

Application control operations are frequently performed in accordance with orders represented by combinations of perforations and absence of perforations in moving perforated tape. Such information is often detected by a plurality of photoelectric cells responsive to light from a lamp passing through the perforations in the tape. The perforations in the tape can only be located in one or more rows of uniformly spaced perforation sites across the width of the tape. The centers of the perforation sites are usually quite close together, often .1" apart, and when the tape readout apparatus is a block reader, the separation between the rows of perforation sites is also quite close, in the order of .1" apart.

Recently photoelectric cells have been manufactured in the form of strips wherein many cells (often in excess of nine) are formed on a single strip in linearly spaced relationship to each other. Such a strip is typically .20" wide and .03" thick and with a length dependent on the number of cells in the strip. For use with the present invention the length of a strip of photoelectric cells containing nine cells is approximately .9 of an inch long. The width of the strips is larger than the separation between the centers of the perforation sites in the tape or the size of the perforations and the distance between them.

To prevent cross-talk, light passing through one perforation on the tape must fall only on one associated photoelectric cell. In the present invention where, as stated above, width of the light sensitive surface of the strips of photoelectric cells is larger than the separation between the centers of the perforations or perforation sites on the tape, cross-talk can be prevented by mounting the strips of cells in racks at an inclined angle to the surface of the tape. In the present embodiment this angle is 30 degrees. Adjacent strips of cells abut each other to decrease the size of the reading head. The rack is positioned so it holds the strips of cells close to the perforations in the tape to further minimize cross-talk. The rack in which the strips are mounted can hold one or more strips so the reading head can function as desired as either a line reader or a block reader depending on whether one or more strips are mounted in the rack.

BRIEF SUMMARY

This invention briefly comprises a reading head for a perforated tape reader wherein one or more strips of photoelectric cells are mounted in a rack at an inclined angle to the surface of the tape. This is done because the minimum dimension, the width, of a photosensitive surface of the strips of photoelectric cells is larger than the size of the perforations and the separation between them, or is larger than the distance between the centers of the perforation sites on the tape. With this arrangement light passing through adjacent perforations on the tape can fall only on the photoelectric cell associated with each perforation.

BACKGROUND

In tape reading heads of the kind described in this invention, the information is typically coded in a binary form on punched tape by combinations of perforations and the absence of perforations. Such information is sensed by a plurality of photoelectric cells responsive to light or other form of radiation passing through the perforations. It is understood that there is one photoelectric cell for each perforation or perforation site in a row across the width of the tape. The perforations and the absence of perforations may be referred to as binary bits in that they are arranged in rows extending perpendicular to the longitudinal axis of the tape and in columns extending parallel to such axis. The columns may constitute a word or any other form of information and this word or other form of information depends on the particular combination of perforations and absence of perforations in a row. In order to read or sense the information, the punched tape is moved relative to the photoelectric cells which are arranged transversely of the tape and the perforations and absence of perforations in each row may be read or sensed one row at a time during a momentary pause in the movement of the tape. Such sensing or reading is known in the art as serial or line reading. In certain applications, however, it may be desired to effect what is known as block reading wherein numbers of rows of perforations are read simultaneously.

The size of the perforations in the tape are quite small and it is apparent that to prevent cross-talk the light entering one perforation must fall only on one associated photoelectric cell. When the light sensitive surface of the photoelectric cells is much larger than the size of the perforations or the distance between the perforation sites, the elimination of cross-talk becomes a problem.

Accordingly, one of the principal objects of this invention is to provide a structure for mounting strips of photoelectric cells in a tape reading head in which the minimum dimensions of the light sensitive surface of the strips of cells is larger than the separation in the perforation sites or the size of the perforations and the distance between them without the presence of cross-talk.

A further important object of this invention is to provide a mounting arrangement for strips of photoelectric cells used in conjunction with a perforated tape readout apparatus in which the minimum dimension of the photosensitive surface of the photocells is larger than the separation between the perforation sites on the tape, but where the mounting arrangement is such that light shining through each perforation falls only on a single photoelectric cell associated with that perforation.

A further object of this invention is to provide a mounting arrangement for strips of photoelectric cells wherein the number of strips of photoelectric cells used with a tape readout apparatus can be quickly and easily varied as desired so that the tape readout apparatus is versatile enough to function either as a line reader or as a block reader in accordance with the number of strips of photocells used.

These and other objects of this invention will become more apparent when better understood in the light of the accompanying specifications and drawings wherein.

Figure 1:
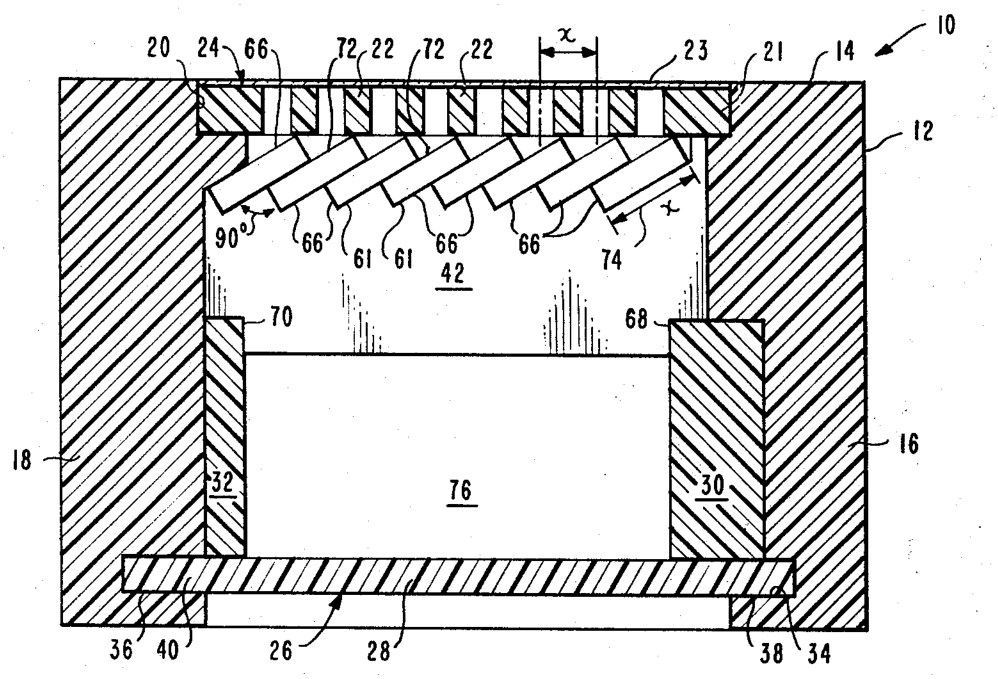
FIG. 1 is an end view of a photoelectric cell mounting structure constructed in accordance with the principals of this invention.

Referring now to FIG. 1 of the drawing, the tape readout apparatus indicated generally by the reference numeral 10 comprises a housing 12. The housing is generally U-shaped in cross-section with an upper wall 14 and depending leg or side walls 16 and 18. The upper wall 14 is, in the present embodiment, formed with a rectangular opening 20 extending therethrough. This opening is closed off by a laminated layer forming a photo mask 24. The inner layer 21 of the photo mask comprises an opaque photo plate having, in the particular embodiment shown, eight rows of uniformly spaced transparent circular portions 22. These portions are formed in the opaque plate by a suitable photographic process well known in the art. A clear transparent glass 23 is bonded to the outer surface of the photo plate by any suitable means to protect the surface of the photo plate. Together the inner layer 21 and the outer layer of transparent glass 23 form the photo mask. With this arrangement surface 14 of housing 12 will have a plurality of rows of transparent spots or portions 22 surrounded by opaque material. As will be explained more clearly below, the separation between the transparent portions in each row and the separation between the rows of transparent portions in the photo mask corresponds to the spacing between the perforation sites in the perforated tape. As is well known in the art, in use, the tape readout is provided with a suitable mechanism so that during the reading operation the perforation sites in the tape overlie the transparent portions in the photo mask.

The housing includes a combined base closure and rack retainer indicated generally by the reference numeral 26. The combined closure and rack retainer is generally U-shaped in cross-section and includes a base wall 28 and upwardly projecting leg portions 30 and 32. Portions 16 and 18 of housing 12 are provided with base wall receiving grooves 34 and 36 respectively. These grooves accommodate the edges 38 and 40 of the base wall 28 of the combined closure and rack retainer 26.

A photo strip retaining rack 42 is provided. This rack is adapted to be mounted in housing 12, and retained in position on the upper edges of leg portions 30 and 32, see FIGS. 1, 2 and 3. Rack 42, in the embodiment shown, see FIG. 3, has a generally rectangular frame with ends 44 and 46 and sides 48 and 50. In addition strips 52, 54, 56, 58, 60 and 62 are parallel to sides 48 and 50 and are connected between ends 44 and 46.

Figure 2:
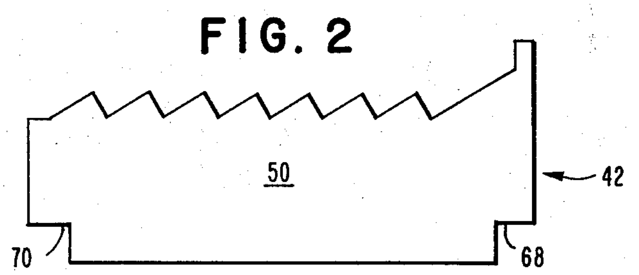
FIG. 2 is a side elevational view of a photoelectric cell strip mounting rack in which the strips of photoelectric cells are mounted.
Figure 3:
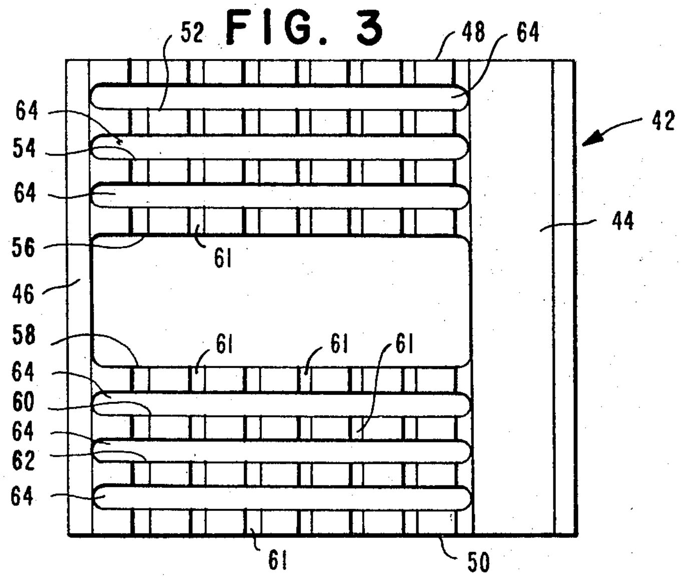
FIG. 3 is a plan view of the mounting rack shown in FIG. 2.
Figure 4:
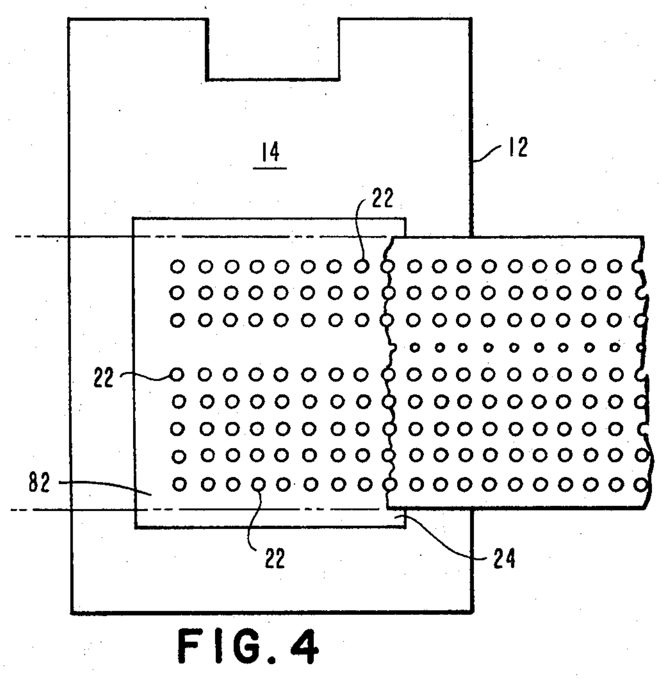
FIG. 4 is a plan view of the housing for the mounting rack.

As best seen in FIG. 2 the upper edges of the sides and connecting strips have saw tooth serrations formed therein. In the particular embodiment shown the angle between the edges of the serrations are right angles. This arrangement is desireable from the standpoint of ease and economy of manufacture. However, it is understood that the angle between the edges of the serrations can be other than a right angle, as will be described below. The serrations in the strip are all in alignment with each other and define a plurality of spaced parallel photoelectric cell strip receiving grooves 61.

Figure 5:
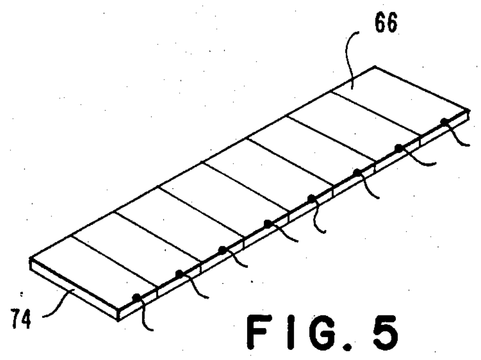
FIG. 5 is a perspective view of a strip of photoelectric cells used in this invention.

The rack 42 is designed to accommodate a plurality of strips of photoelectric cells 66 mounted in grooves 61, see FIG. 5. The strips of cells shown are generally rectangular in cross-section and each strip can be made to contain as many linearly spaced photocells as desired. In the embodiment shown, however, the strips each include eight photoelectric cells. As stated above the number of photoelectric cells in the strips must conform to the number of perforation sites in a row of perforation sites across the width of the perforated tape and to the number of optically transparent spots or portions 22 in each row on the photo mask 24.

As seen in FIG. 1, one or more strips of photoelectric cells lie in the grooves 61 formed in the aligned saw tooth serrations in the sides and adjacent strips of the rack 42. In the embodiment shown in FIG. 1, the rack is designed to hold up to eight strips of photocells and in the embodiment shown the rack is completely filled. It is understood, however, that despite the indicated capacity of the rack shown, it is contemplated that the particular rack shown can hold anywhere from one to eight strips of photocells. In the event the tape readout 10 is to function as a line reader, the rack would hold only one strip of photocells. In the event the tape readout 10 is to function as a block reader the rack would hold two or more strips of photocells. Consequently, the tape readout apparatus shown is very flexible because the same readout apparatus can function either as a line reader or as a block reader, depending on the number of strips of photocells mounted in rack 42.

As seen in FIG. 1, the lower sides of rack 42 are provided with grooves 68 and 70. These grooves ride on and are supported by the upper ends of legs 30 and 32 of the combined closure and rack retainer. With this arrangement, the strips of photoelectric cells are positioned just beneath the rows of transparent portions 22 of the photo mask 24.

In the embodiment shown in FIG. 1, each strip 66 has a light sensitive surface 72. The design of rack 42 is such that the strips of photo cells 66 abut against the light sensitive surface of an adjacent strip so that half of the light sensitive surface of each cell is covered. The remaining half of the light sensitive surface of each cell lies beneath a transparent spot or portion 22 of the photo mask 24. With this arrangement there is a photoelectric cell associated with each transparent portion of the photo mask and each perforation site in each row of perforation sites across the width of the tape 80 when a portion of the tape is in position to be read.

It is noted that the angle between the sides of the serrations forming the grooves 61 (which in the embodiment shown happens to be 90°) is the same as the angle between the sides of the strips 66 (which are seen to be rectangular in cross-section). Consequently the strips can lie very close or almost abut each other. This makes the photoelectric cell mounting structure most compact. If the angles were different the strips of photoelectric cells could not lie so close to each other and a larger separation between the strips would be required which would increase the size of the tape readout.

It is further noted that the width dimension 74 of the light sensitive surface of the strip of photoelectric cells is, in the embodiment shown, twice the distance between the light sensitive portions of the photo mask 24. However, it is seen that despite this, because the strips of photocells are all inclined to the surface of the photo mask and the tape over the photo mask, light shining through perforations in the tape and through each of the transparent portions 22 in the photo mask 24 falls only on a single photoelectric cell associated with the light sensitive spot. With this ararngement cross-talk is avoided, and this is done without the use of light transmitting tubes or without increasing the size of the readout structure.

Wires from the strips 66 of photoelectric cells would feed down through the slots 64 in rack 42 and out of opening 76 below rack 42 and above bottom rack 26 for connection into the circuit.

In the embodiment shown, the angle between the sides of the serrations on the rack is 90° to conform to the angle between the light sensitive surface 72 and sides of the strips of photoelectric cells. It is however possible to take advantage of the compact arrangement of the photocell strips wherein the adjacent strips of photocells all almost abut against each other for other shapes of photocell strips. In particular the strips can be shaped so they are parallelograms in cross-section. It is only necessary that the angle between the sides of the serrations in the sides and strips of the rack be the same as corresponding sides of the cross-section of the photocell strips in order for the strips to lie very close to each other.

Of course, in situations where it is not desirable or necessary for the sides of the photoelectric strips to lie very close to each other, the angles forming the sides of the serrations in the side walls and edges of the strips of the rack can have any desired relationship, provided, however, where the width dimension of the light sensitive surface of the photoelectric strips is greater than the separation between the perforation sites on the tape or the light sensitive spots on each row of the photo mask, the photoelectric strips must be mounted in a stepped relation and inclined at an angle to the surface of the tape or the photo mask.

Figure 6:
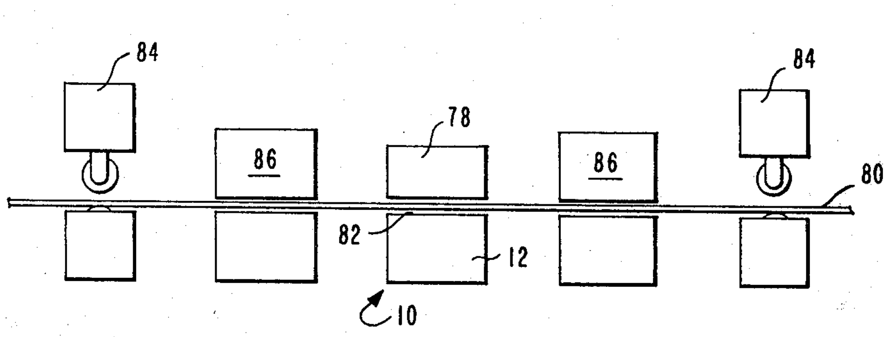
FIG. 6 is a diagrammatic view of a tape reading head in association with the brakes and capstans of a tape readout apparatus.

The general organization of the tape readout apparatus is shown in FIG. 6. There it is seen that a light source 78 is mounted over the tape readout 10. Perforated tape 80 is mounted for movement between the light source 78 and the tape readout 10 over the surface 82 of the photo mask 24. The tape is moved to the right or left by means of capstans 84. Tape brakes 86 which are usually magnetically actuated are positioned on either side of the tape readout, in a manner well known in the art, for abruptly stopping movement of the tape while the tape is being read. It is evident that while the tape is stopped, light from light source 78 shining through perforations on the portion of tape 80 resting on support surface 82 will fall only on the photoelectric cells associated with the particular perforated perforation sites on the tape. The output of these photoelectric cells is connected to provide the control function desired. This as explained above is made possible because each photoelectric cell in each strip is associated with a particular transparent portion of the photo mask and with a perforation site on the tape and each photoelectric cell connected to the above-described structure can respond only to light shining through the associated perforation site in the tape or in the associated transparent spot in the photo mask while the tape is momentarily stopped during the reading operation.

The readout apparatus is described as using a light source in conjunction with photoelectric cells or cells having light sensitive surfaces. It is understood that the word light, or light sensitive, or photoelectric cell is defined as including any form of radiation source and cells which respond to any form of radiation.

Obviously many modifications and variations of the present invention are possible in the light of the above teachings. It is therefore to be understood that within the scope of the appended claims the invention can be practiced otherwise than as specifically described.

I claim:

1. In a tape readout apparatus of the class described wherein perforated tape having a predetermined number of perforations in perforation sites in a plurality of rows across the width of a tape is moved over the surface of a tape reader, a rack, said rack having a plurality of spaced parallel grooves in one surface thereof, strips of light sensitive cells mounted in said grooves in spaced parallel rows, each strip of light sensitive cells including one cell adapted to be associated with each perforation site in said row of perforation sites across the width of the tape, the width of the strips of light sensitive cells larger than the size of the perforations and the separation between the perforation sites across the width of the tape, the grooves in said rack shaped so said strips of light sensitive cells are mounted in stepped relation to each other and inclined to the surface of the tape reader in such a way that each cell in the strip of light sensitive cells in the grooves of the rack is associated with a particular perforation site in the tape and is in position to receive only the light passing through a perforation in the associated perforation site in the tape.

2. The tape readout apparatus described in claim 1 wherein said rack comprises a plurality of strips of sheet material mounted in spaced parallel relationship, the edges of the strips having saw tooth serrations formed therein, the serrations in each strip in alignment with the serrations on adjacent strips and defining thereby a plurality of spaced parallel light sensitive cell strip receiving grooves.

3. The tape readout apparatus described in claim 2 including a housing, said housing having an upper wall serving as a tape support surface, said tape support surface having a rectangular opening formed therein, a photo mask mounted in said rectangular opening, a plurality of rows of transparent spots formed in said photo mask, said rack mounted in said housing below said photo mask and holding the strips of photoelectric cells therein in such a way that each photocell in a strip of photoelectric cells is associated with a particular transparent spot in the photo mask whereby light shining through the said particular transparent spot falls only on a particular photoelectric cell in a strip lying in the groove in the rack.

4. In a tape readout apparatus of the class described, a housing, said housing having an upper wall and depending side walls, said upper wall serving as a tape support surface, said tape support surface having a rectangular opening formed therein, a photo mask mounted in said rectangular opening, a plurality of rows of transparent spots formed in said photo mask, a combined base closure and rack retainer comprising a base wall and upwardly extending legs, said base wall secured to the bottom edge of the depending side walls of the housing, with the upwardly extending legs projecting up inside the housing, a rack mounted on said upwardly extending legs, said rack including a plurality of strips of sheet material mounted in spaced parallel relationship, the edges of the strips having saw tooth serrations, the serrations in each strip in alignment with the serrations in adjacent parallel strips and defining thereby a plurality of spaced parallel grooves, strips of photoelectric cells mounted in said grooves, the width of the light sensitive surface of the strips of photoelectric cells larger than the separation between the transparent spots in said photo mask, said grooves in said rack holding said strips of photoelectric cells in stepped relation to each other and holding the light sensitive surface of the strips inclined to said tape support surface in such a way that each cell in the strip of photoelectric cells is associated with a particular transparent spot in the photo mask and is positioned to reecive only the light shining through the associated photomask.

5. The tape readout apparatus described in claim 4 wherein the serration angle in the strips of the rack is the same as the angles forming a corner of the cross-section of said strips of photoelectric cells, said strips of photoelectric cells mounted in said grooves in said rack so said strips of photoelectric cells lie very close to each other to form a more compact tape readout apparatus.

6. The tape readout apparatus described in claim 5 wherein the serration angle in the strips of the rack is 90° and the strips of photoelectric cells are rectangular in cross-section.

References Cited

UNITED STATES PATENTS 3,042,806 7/1962 Lubin ------------ 250—239 X 3,188,475 6/1965 Miller ------------ 250—219 X 3,238,357 3/1966 Minka ------------ 250—219 X 3,253,128 5/1966 Wu Chen et al. ---- 250—219 X 3,327,123 6/1967 Rychlewski --------- 250—219

RALPH G. NILSON, *Primary Examiner.*

M. A. LEAVITT, *Assistant Examiner.*

U.S. Cl. X.R.

250—219